United States Patent
Noy et al.

(10) Patent No.: US 8,051,187 B2
(45) Date of Patent: Nov. 1, 2011

(54) METHODS FOR AUTOMATIC CATEGORIZATION OF INTERNAL AND EXTERNAL COMMUNICATION FOR PREVENTING DATA LOSS

(75) Inventors: Tomer Noy, Tel Aviv (IL); Alon Kantor, Tel Aviv (IL); Uri Bialik, Ramat Efal (IL); Yoav Kirsch, Macabim (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 210 days.

(21) Appl. No.: 12/340,830

(22) Filed: Dec. 22, 2008

(65) Prior Publication Data
US 2010/0161830 A1    Jun. 24, 2010

(51) Int. Cl.
*G06F 13/00* (2006.01)
(52) U.S. Cl. ........ 709/229; 709/224; 709/220; 709/221; 706/14
(58) Field of Classification Search .......... 709/224, 709/225, 220–222, 229; 706/14, 12, 45; 726/4, 26–30
See application file for complete search history.

(56) References Cited

U.S. PATENT DOCUMENTS

| 7,124,438 | B2 | 10/2006 | Judge et al. | |
|---|---|---|---|---|
| 7,376,618 | B1 | 5/2008 | Anderson et al. | |
| 7,644,144 | B1 * | 1/2010 | Horvitz et al. | 709/223 |
| 7,747,719 | B1 * | 6/2010 | Horvitz et al. | 709/223 |
| 2004/0199597 | A1 * | 10/2004 | Libbey et al. | 709/207 |
| 2007/0226504 | A1 | 9/2007 | de la Iglesia et al. | |
| 2008/0086432 | A1 | 4/2008 | Schmidtler et al. | |
| 2008/0195621 | A1 * | 8/2008 | Tedesco et al. | 707/9 |
| 2008/0275991 | A1 * | 11/2008 | Matsuzaki et al. | 709/225 |
| 2009/0113232 | A1 * | 4/2009 | Park et al. | 714/2 |
| 2009/0182818 | A1 * | 7/2009 | Krywaniuk | 709/206 |
| 2010/0095377 | A1 * | 4/2010 | Krywaniuk | 726/22 |

OTHER PUBLICATIONS

Young-Woo Seo and Katia Sycara "Cost-Sensitive Access Control for Illegitimate Confidential Access by Insiders" in *IEEE International Conference on Intelligence and Security Information* (ISI 2006), May 2006 pp. 117-128.

* cited by examiner

*Primary Examiner* — Kenneth R Coulter
(74) *Attorney, Agent, or Firm* — Mark M. Friedman

(57) ABSTRACT

Disclosed are methods for automatic categorization of internal and external communication, the method including the steps of: defining groups of entities that transmit data; monitoring data flow of the groups; extracting the data, from the data flow, for learning traffic-flow characteristics of the groups; classifying the data into group flows; upon the data being transmitted, checking the data to determine whether the data is designated as group-internal; and blocking data traffic for data that is group-internal. Preferably, the step of monitoring includes assigning data weights to the data using Bayesian methods. Most preferably, the step of classifying includes classifying the data using Bayesian methods for evaluating the data weights. Preferably, the step of blocking includes blocking data traffic between members of two or more groups. Preferably, the method further includes the step of: enabling an authorized entity to unblock the data traffic.

16 Claims, 1 Drawing Sheet

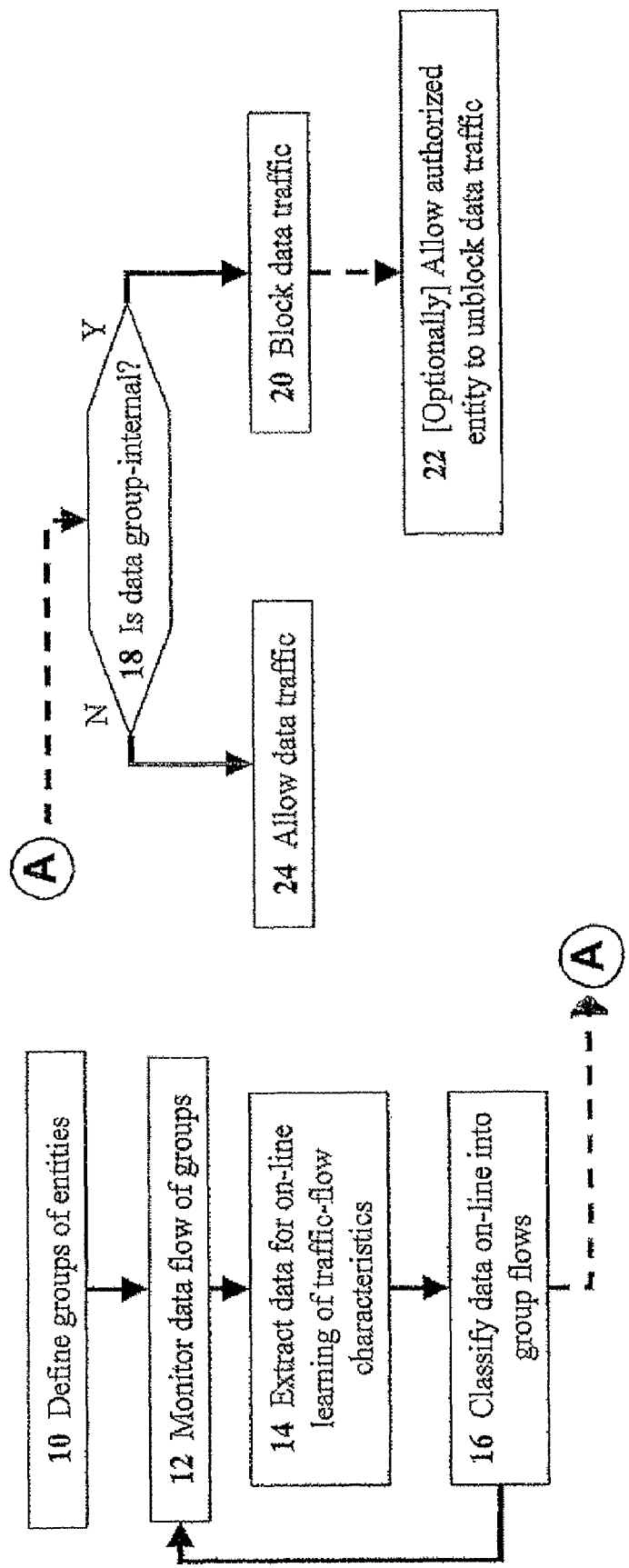

METHODS FOR AUTOMATIC CATEGORIZATION OF INTERNAL AND EXTERNAL COMMUNICATION FOR PREVENTING DATA LOSS

FIELD AND BACKGROUND OF THE INVENTION

The present invention relates to methods for automatic categorization of internal and external communication for preventing data loss.

Data loss occurs when data that belongs to a group of people is exposed to someone outside of the group. Typically, data loss occurs when a person who has access to data passes the data to another person who, by policy, should not have access to the data (e.g. by e-mail). The action causing the data loss may be accidental or intentional. In order to prevent such a situation, organizations typically install a data-loss prevention (DLP) system. Common DLP systems perform the following processes:

(1) classify all data in the organization;
(2) define who can access which data;
(3) monitor data flow; and
(4) block communication if data goes to an unauthorized user.

The classification process is resource- and time-consuming. In addition, it is an ongoing process, since new data is constantly being created over time. In some cases, it is impossible to access all data a priori, and there is no one that has sufficient privileges to even classify the data.

The problem of preventing data loss is in some ways similar to other data classification problems, such as that of preventing unwanted incoming e-mail, also known as "spam". However, it is a distinct and separate problem from spam detection.

In the prior art, Bayesian methods are used in numerous systems to identify spam e-mail messages (e.g. POPFile). Recommind, Inc., San Francisco, Calif., has an e-mail categorization product that uses a Bayesian approach, but does not proactively prevent data-loss events. U.S. Pat. No. 7,376,618 by Anderson et al. (hereinafter Anderson '618), teaches detecting and measuring risk with predictive models using content mining. Anderson '618 uses Bayesian methods to estimate the risk of commercial transactions (i.e. fraud) while categorizing such transactions. Similar techniques are being used to perform prior-art searches automatically (see US Patent Publication No. 20080086432 by Schmidtler et al. on data classification methods using machine learning techniques).

Code Green Networks, Inc., Sunnyvale, Calif., uses a Bayesian method to detect documents such as resumes, source code, and financial statements, relying on a pre-defined "dictionary" of reference terms. Preparing such a dictionary in advance is problematic for the reasons mentioned above. Reconnex Corporation, Mountain View, Calif., also uses a Bayesian method to detect document similarity as disclosed in US Patent Publication No. 20070226504 by de la Iglesia et al. for signature match processing in a document registration system.

Seo et al, in IEEE International Conference on Intelligence and Security Informatics (ISI 2006), May, 2006, pp. 117-128, discusses the use of statistical document classification in the context of access control decisions when users need to access document repositories. Titus Labs, Ottawa, ON, Canada, and Liquid Machines, Inc., Waltham, Mass., have also developed a joint DLP solution that uses document categorization.

CipherTrust, Inc. (owned by Secure Computing Corporation, San Jose, Calif.) uses machine learning to categorize/classify documents. The documents are subsequently used to enforce security policy, including outbound e-mail Categorization by CipherTrust does not distinguish between "internal" and "external" document classes (see U.S. Pat. No. 7,124,438 by Judge et al. on systems and methods for anomaly detection in patterns of monitored communications).

It would be desirable to have methods for automatic categorization of internal and external communication for preventing data loss, inter alia, using statistical analysis of textual data with no a priori information, to categorize messages (e.g. "internal" or "external"), detect, and prevent data-loss events.

SUMMARY OF THE INVENTION

It is the purpose of the present invention to provide methods for automatic categorization of internal and external communication for preventing data loss.

Preferred embodiments of the present invention employ "auto-learning" schemes to address real-life difficulties in classifying data off-line, for the purpose of data-loss prevention. Such schemes allow an organization to classify data without prior knowledge of what is private data and what is public data. In addition, the schemes solve data-classification maintenance problems. Instead of classifying all data in advance, the system decides in "run-time" whether the receiver is allowed to view the data. For example, the system monitors organizational traffic, and learns which data belongs to which organizational group (e.g. marketing, R&D, and senior management). The system then identifies keywords and style that are indicative of each group in order to categorize the groups. Subsequent traffic is then monitored for such keywords to determine group relations. Access control policy is then used to regulate how data is transmitted within and between various groups.

Therefore, according to the present invention, there is provided for the first time a method for automatic categorization of internal and external communication, the method including the steps of: (a) defining groups of entities that transmit data; (b) monitoring data flow of the groups; (c) extracting the data, from the data flow, for learning traffic-flow characteristics of the groups; (d) classifying the data into group flows; (e) upon the data being transmitted, checking the data to determine whether the data is designated as group-internal; and (f) blocking data traffic for data that is group-internal.

Preferably, the step of defining is performed by manually designating the entities.

Preferably, the step of defining is performed by automatically extracting the entities from a database according to a grouping rule.

Preferably, the data flow includes at least one data object selected from the group consisting of: an e-mail message, an instant message, an EDI (Electronic Data Interchange) transaction, a business-to-business message, and an ebXML (Electronic Business using eXtensible Markup Language) message.

Preferably, the step of monitoring includes assigning data weights to the data using Bayesian methods.

Most preferably, the step of classifying includes classifying the data using Bayesian methods for evaluating the data weights.

Preferably, the step of blocking includes blocking data traffic between members of two or more groups.

Preferably, the method further includes the step of: (g) enabling an authorized entity to unblock the data traffic.

According to the present invention, there is provided for the first time a computer-readable storage medium having computer-readable code embodied on the computer-readable storage medium, the computer-readable code comprising: (a) program code for defining groups of entities that transmit data; (b) program code for monitoring data flow of the groups; (c) program code for extracting the data, from the data flow, for learning traffic-flow characteristics of the groups; (d) program code for classifying the data into group flows; (e) program code for, upon the data being transmitted, checking the data to determine whether the data is designated as group-internal; and (f) program code for blocking data traffic for data that is group-internal.

Preferably, the program code for defining is operative to enable the entities to be manually designated.

Preferably, the program code for defining is operative to automatically extract the entities from a database according to a grouping rule.

Preferably, the data flow includes at least one data object selected from the group consisting of: an e-mail message, an instant message, an EDI (Electronic Data Interchange) transaction, a business-to-business message, and an ebXML (Electronic Business using eXtensible Markup Language) message.

Preferably, the program code for monitoring includes program code for assigning data weights to the data using Bayesian methods.

Most preferably, the program code for classifying includes program code for classifying the data using Bayesian methods for evaluating the data weights.

Preferably, the program code for blocking includes program code for blocking data traffic between members of two or more groups.

Preferably, the computer-readable code further includes: (g) program code for enabling an authorized entity to unblock the data traffic.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 1 is a simplified flowchart of the initial and auto-learning steps for automatic categorization of internal and external communication for preventing data loss, according to preferred embodiments of the present invention;

FIG. 2 is a simplified flowchart of the group-designation and traffic-control steps for automatic categorization of internal and external communication for preventing data loss, according to preferred embodiments of the present invention.

DESCRIPTION OF THE PREFERRED EMBODIMENTS

The present invention relates to methods for automatic categorization of internal and external communication for preventing data loss. The principles and operation for methods for automatic categorization of internal and external communication, according to the present invention, may be better understood with reference to the accompanying description and the drawings.

As mentioned above, preferred embodiments of the present invention employ auto-learning classification schemes. Instead of classifying all data in advance, the system classifies the data continuously; and then decides in run-time whether the receiver is allowed to view the data.

Referring now to the drawings, FIG. 1 is a simplified flowchart of the initial and auto-learning steps for automatic categorization of internal and external communication for preventing data loss, according to preferred embodiments of the present invention. The process starts with an initial procedure of defining groups of entities (e.g. organizational departments, users, and department computer servers) capable of sending and/or receiving data traffic (Step 10). The grouping process may be performed manually, or may be automated by utilizing existing organizational information sources (e.g. enterprise directories).

All data flow of the groups is then monitored (Step 12). The data is extracted for on-line learning of traffic-flow characteristics (Step 14). The data is then classified on-line into group flows (i.e. traffic flow patterns according to group) (Step 16). The monitoring, extracting, and classifying procedures (Steps 12-16) are continuous auto-learning processes which are constantly iterated for all data traversing the network, while the overall process continues in FIG. 2.

FIG. 2 is a simplified flowchart of the group-designation and traffic-control steps for automatic categorization of internal and external communication for preventing data loss, according to preferred embodiments of the present invention. When data is transmitted from a defined group to another group (or outside the defined groups), the data is checked to determine whether the data is designated as "group-internal" (i.e. communication that is restricted to be within a designated group or set of groups) (Step 18). If the data is group-internal, then data traffic is blocked (Step 20). Optionally, an authorized entity (e.g. a user, an administrator, and/or a system server) can have privileges to unblock the data traffic (Step 22). If the data is "group-external" (i.e. not restricted), then data traffic is allowed (Step 24).

Preferred embodiments of the present invention provide schemes for defining whether data is group-internal. The following are exemplary embodiments of such schemes. Given a data set (e.g. an email message), it is possible to represent the data set as a list of words. A word weight can be defined to be a number that identifies whether a word is a group-internal word to a given group (weight can be positive or negative). A large positive word weight means there is a high probability that a word is group-internal. A large negative word weight means there is a high probability that a word is group-external. Word weights are automatically assigned to each word as part of the continuous learning of traffic patterns.

For each data set, a data weight can be defined as the sum of all word weights in the data set. The data set is considered group-internal if the data weight exceeds a pre-defined threshold. If the data set is group-internal, and the communication is group-external (i.e. the communication is not restricted to within the group), then such an occurrence can be designated as a DLP violation, and an organizational policy for such instances can be implemented.

Assigning appropriate words weights without any prior knowledge is a complicated task. If a word represents private-group data, the word will appear in private-group discussion and communication, and will not be part of other groups' communication. For example, if company ABC plans to buy company XYZ, and only ABC management knows about the acquisition, then the word XYZ may appear in management communication, but will not appear in non-management communication. It is then possible to reverse the process (using Bayes' law) to calculate the probability that a communication is management communication based on the fact that the word XYZ is part of the communication.

To calculate word weights, a system monitors message traffic (e.g. enterprise or regular e-mail, instant messaging, and business-transaction systems) continuously. In the e-mail embodiment, for each e-mail and group, consider the e-mail to be "group-sent" if the sender of the e-mail belongs to a designated group. The e-mail is considered group-internal if all of the e-mail's recipients (e.g. to, cc, bcc) belong to the designated group and if the sender belongs to the designated group. The e-mail is considered group-external if one recipient is not from the designated group, and the e-mail is group-sent.

Under normal operation the system keeps learning the traffic patterns on a continuous basis in parallel to applying security policy to the traffic. But there is an initial period where traffic patterns are monitored and policy is not applied, since there is not enough information yet available to reach security decisions with a high level of confidence.

For each word, the observed occurrence in group-internal e-mail that contains the word (i.e. number of applicable messages that contain the word) is defined. The observed occurrence in group-internal e-mail that does not contain the word is also defined. The observed occurrence in group-external e-mail that contains the word (and that do not contain the word) are also defined.

In order to identify group-internal words, the probability that a given word is "group-neutral" (i.e. neither group-internal nor group-external) is first calculated. To do that, the expected occurrence is computed. For each word, a statistical estimation of the probability that the word is group-neutral is performed. The probability is a value between 0 and 1. The lower the value is, the less likely that the word is group-neutral. To decide whether a non-group-neutral word is group-internal, the observed occurrence in group-internal e-mail is compared to the expected occurrence. If the observed occurrence is greater, then the word is considered group-internal.

To calculate data weights (i.e. e-mail weights for this exemplary embodiment), a simple approach is to calculate the sum of the word weights for all unique words. A more advanced method is to define a sliding window weight which is a sum of the word weights for only designated words. The data weight is the maximum window weight for all "windows" that are defined. The data weight is ultimately used to make a binary decision regarding whether the data should or should not be blocked.

While the invention has been described with respect to a limited number of embodiments, it will be appreciated that many variations, modifications, and other applications of the invention may be made.

What is claimed is:

1. A method, executing on hardware, for automatic categorization of internal and external communication, the method comprising the steps of:
   (a) defining groups of entities that use hardware to transmit data;
   (b) monitoring data flow of said groups;
   (c) extracting said data, from said data flow, for learning traffic-flow characteristics of said groups;
   (d) classifying said data into group flows;
   (e) upon said data being transmitted, checking said data to determine whether said data is designated as group-internal; and
   (f) if said data is designated as group-internal: blocking said transmission of said data beyond said group to which said data is group-internal.

2. The method of claim 1, wherein said step of defining is performed by manually designating said entities.

3. The method of claim 1, wherein said step of defining is performed by automatically extracting said entities from a database according to a grouping rule.

4. The method of claim 1, wherein said data flow includes at least one data object selected from the group consisting of: an e-mail message, an instant message, an EDI (Electronic Data Interchange) transaction, a business-to-business message, and an ebXML (Electronic Business using eXtensible Markup Language) message.

5. The method of claim 1, wherein said step of monitoring includes assigning data weights to said data using Bayesian methods.

6. The method of claim 5, wherein said step of classifying includes classifying said data using Bayesian methods for evaluating said data weights.

7. The method of claim 1, wherein said step of blocking includes blocking said transmission of said data between members of two or more groups.

8. The method of claim 1, the method further comprising the step of:
   (g) enabling an authorized entity to unblock said transmission of said data.

9. A non-transitory computer-readable storage medium having computer-readable code embodied on the computer-readable storage medium, the computer-readable code comprising:
   (a) program code for defining groups of entities that use hardware to transmit data;
   (b) program code for monitoring data flow of said groups;
   (c) program code for extracting said data, from said data flow, for learning traffic-flow characteristics of said groups;
   (d) program code for classifying said data into group flows;
   (e) program code for, upon said data being transmitted, checking said data to determine whether said data is designated as group-internal; and
   (f) program code for: if said data is designated as group-internal: blocking said transmission of said data beyond said group to which said data is group-internal.

10. The storage medium of claim 9, wherein said program code for defining is operative to enable said entities to be manually designated.

11. The storage medium of claim 9, wherein said program code for defining is operative to automatically extract said entities from a database according to a grouping rule.

12. The storage medium of claim 9, wherein said data flow includes at least one data object selected from the group consisting of: an e-mail message, an instant message, an EDI (Electronic Data Interchange) transaction, a business-to-business message, and an ebXML (Electronic Business using extensible Markup Language) message.

13. The storage medium of claim 9, wherein said program code for monitoring includes program code for assigning data weights to said data using Bayesian methods.

14. The storage medium of claim 13, wherein said program code for classifying includes program code for classifying said data using Bayesian methods for evaluating said data weights.

15. The storage medium of claim 9, wherein said program code for blocking includes program code for blocking said transmission of said data between members of two or more said groups.

16. The storage medium of claim 9, the computer-readable code further comprising:
   (g) program code for enabling an authorized entity to unblock said transmission of said data.

* * * * *